United States Patent [19]

Shinohara et al.

[11] Patent Number: 5,178,055
[45] Date of Patent: Jan. 12, 1993

[54] VACUUM BOOSTER

[75] Inventors: Takayoshi Shinohara; Toshiyuki Suwa, both of Nagano, Japan

[73] Assignee: Nissin Kogyo Kabushiki Kaisha, Nagano, Japan

[21] Appl. No.: 696,795

[22] Filed: May 7, 1991

[30] Foreign Application Priority Data

Jun. 22, 1990 [JP] Japan .............................. 2-66584[U]
Oct. 22, 1990 [JP] Japan ............................ 2-110367[U]

[51] Int. Cl.$^5$ ................................................ F15B 9/10
[52] U.S. Cl. .................................... 91/376 R; 92/99; 92/101; 91/369
[58] Field of Search ............... 91/369.1, 369.2, 376 R; 92/98 R, 99, 101, 102

[56] References Cited

U.S. PATENT DOCUMENTS

| | | | |
|---|---|---|---|
| 3,352,209 | 11/1967 | Cripe | 91/391 |
| 3,552,272 | 1/1971 | Parsons | 91/369 |
| 4,107,926 | 8/1978 | Adachi | 60/548 |
| 4,399,735 | 8/1983 | Katagiri et al. | 91/369.2 |
| 4,729,287 | 3/1988 | Boehm et al. | 91/369.2 |
| 4,813,337 | 3/1989 | Endo | 91/369.2 |
| 4,987,824 | 1/1991 | Shinohara et al. | 91/369.1 |
| 5,005,464 | 4/1991 | Takaku | 91/369.2 X |
| 5,046,398 | 9/1991 | Hamamiya et al. | 91/369.2 |

FOREIGN PATENT DOCUMENTS

| | | |
|---|---|---|
| 0067775 | 12/1982 | European Pat. Off. ............ 91/369.2 |
| 52-28072 | 6/1977 | Japan . |
| 57-46206 | 10/1982 | Japan . |
| 1-69068 | 5/1989 | Japan . |
| 1-35979 | 11/1989 | Japan . |
| 1486609 | 9/1977 | United Kingdom . |

Primary Examiner—Edward K. Look
Assistant Examiner—Hoang Nguyen
Attorney, Agent, or Firm—Armstrong, Westerman, Hattori, McLeland & Naughton

[57] ABSTRACT

A vacuum booster includes a booster piston having a front surface facing a vacuum chamber, a diaphragm superposed on the rear surface of the booster piston and having a rear surface facing a working chamber adapted to be selectively put into communication with the vacuum chamber or the atmosphere, a piston boss carried on a central portion of the rear wall of the booster shell for a longitudinal reciprocal movement and provided with an annular step with which an inner peripheral bead of the diaphragm engages from the rear, and an annular stopper retained on the piston boss to abut against the inner peripheral bead from the rear. The stopper includes an annular retaining portion at an outer periphery thereof to project forwardly which has a curved front end, and the inner peripheral bead of the diaphragm is formed into a ring shape projecting rearwardly to have its outer periphery engaged with the stopper retaining portion. The curved front end of the retaining portion serves as a center about which the diaphragm is deflected toward the working chamber and thus avoids any damage to the diaphragm. When the diaphragm is deflected toward the working chamber, its inner peripheral bead can be urged radially inwardly by the retaining portion, thus reducing a load imposed on the bead to separate it away from the step of the piston boss, thereby improving the reliability of the stopper.

5 Claims, 5 Drawing Sheets

VACUUM BOOSTER

BACKGROUND OF THE INVENTION

1. Field of the Invention

The field of the present invention is vacuum boosters of the type in which a booster piston is contained in a booster shell for a longitudinal reciprocal movement and has a front surface facing a vacuum chamber to be connected to a vacuum pressure source, a diaphragm being superposed on a rear surface of the booster piston and having a rear surface facing a working chamber adapted to be selectively put into communication with the vacuum chamber or the atmosphere through a control valve which is connected to an input rod, the diaphragm having an outer peripheral bead coupled to the booster shell, a piston boss carried on a central portion of a rear wall of the booster shell for longitudinal reciprocal movement and provided with an annular step with which an inner peripheral bead of the diaphragm engages from the rear, and a stopper retained on the piston boss and formed in an annular fashion to abut against the inner peripheral bead from the rear.

2. Description of the Prior Art

Such vacuum booster is conventionally known, for example, from Japanese Utility Model Laid-open No. 114474/89.

In the above prior art vacuum booster, the stopper is formed by punching a metal sheet into a circular flat plate-like configuration so as to form, on its inner peripheral edge, a chrysanthemum-shaped fixture to engage the piston boss. The stopper is allowed to abut against a rear surface of the inner peripheral bead of the diaphragm in assembly. Accordingly, when a force is applied to the inner peripheral edge of the diaphragm in a direction away from the step of the piston boss due to deflection of a radially intermediate portion of the diaphragm toward the vacuum chamber forward of the booster piston during a boosting operation, the inner peripheral bead of the diaphragm is retained by the stopper and thereby prevented from being separated from the piston boss. However, if the booster piston is urged forwardly in a condition in which there is no vacuum pressure in the vacuum pressure source and no vacuum pressure is stored in the vacuum chamber, the working chamber is put out of communication with the vacuum chamber and into communication with the atmosphere by a control valve, so that the air in the vacuum chamber is compressed and intended to be discharged toward the vacuum pressure source. But the pressure in the vacuum chamber may be increased due to a resistance against such discharge. In this case, the diaphragm is deflected toward the working chamber about a portion thereof corresponding to the outer peripheral edge of the stopper. However, if the stopper is formed by punching a metal sheet as in the prior art, the outer peripheral edge thereof is not smooth, and if the rear surface of the diaphragm is urged strongly against the outer peripheral edge of the stopper as described above, such portion of the diaphragm may be damaged. Moreover, when the diaphragm is deflected toward the working chamber due to an increase in pressure in the vacuum chamber as described above, a force is applied to the inner peripheral bead of the diaphragm in the direction away from the step of the piston boss. Therefore, it is necessary for the stopper to have a rigidity sufficient to retain the inner peripheral bead on the step against a slip-out load acting on the stopper, and it is necessary for the stopper to engage the piston boss with a sufficient strength.

SUMMARY OF THE INVENTION

Accordingly, it is an object of the present invention to provide a vacuum booster, wherein any damage to the diaphragm by the stopper can be avoided and any increase in rigidity or engaging strength of the stopper is not necessary.

To achieve the above object, according to the present invention, there is provided a vacuum booster comprising: a booster piston contained in a booster shell for a longitudinal reciprocal movement and having a front surface facing a vacuum chamber leading to a vacuum pressure source; a diaphragm superposed on a rear surface of the booster piston and having a rear surface facing a working chamber adapted to be selectively put into communication with the vacuum chamber or the atmosphere through a control valve which is connected to an input rod, the diaphragm having an outer peripheral bead coupled to the booster shell; a piston boss carried on a central portion of a rear wall of the booster shell for a longitudinal reciprocal movement and provided with an annular step with which an inner peripheral bead of the diaphragm is engages from the rear; and a stopper retained to the piston boss and formed in an annular fashion to abut against the inner peripheral bead of the piston boss from the rear; the stopper including an annular retaining portion provided around an outer periphery of the stopper so as to project forwardly and having a curved front end, and the inner peripheral bead of the diaphragm being formed into a ring shape projecting rearwardly so as to engage an outer periphery of the inner peripheral bead with the retaining portion.

With such construction, even if the diaphragm is deflected toward the working chamber about the curved front end of the retaining portion, the diaphragm cannot be damaged. In addition, when the diaphragm is deflected toward the working chamber, the inner peripheral bead of the diaphragm can be surged radially inwardly by the retaining portion, thereby providing a reduction in the load to be imposed in a direction away from the step of the piston boss and providing an improvement in reliability of the stopper.

In another aspect of the present invention, the stopper comprises a base plate portion formed into a flat ring shape to come into close contact with the rear surface of the inner peripheral bead of the diaphragm, a plurality of pawls projecting rearwardly from an inner peripheral edge of the base plate portion at circumferentially spaced locations to engage the piston boss, and a plurality of flat portions extending radially inwardly from the inner peripheral edge of the base plate portion between the adjacent pawls to be put into close contact with the rear surface of the inner peripheral bead, a slit being provided between a base end of the pawl and the flat portion, the retaining portion projecting from an outer peripheral edge of the base plate portion.

This arrangement ensures that the flat portion provided between the adjacent pawls enables an increase in contact area of the stopper with the inner peripheral bead, thereby stabilizing the fixing of the inner peripheral bead to the piston boss. Moreover, the interposition of the slit between each flat portion and the base end of each pawl ensures that a resilient force can be effectively exhibited by each pawl, despite the provision of the flat portions.

The above and other objects, features and advantages of the invention will become apparent from a reading of the following description of the preferred embodiments, taken in conjunction with the accompanying drawings.

BRIEF DESCRIPTION OF THE DRAWINGS

FIGS. 1 to 3 illustrate a first embodiment of the present invention, wherein

FIGS. 5 to 7 illustrate a third embodiment of the present invention, wherein

DESCRIPTION OF THE PREFERRED EMBODIMENTS

The present invention will now be described by way of embodiments in connection with the accompanying drawings.

Figure 1:
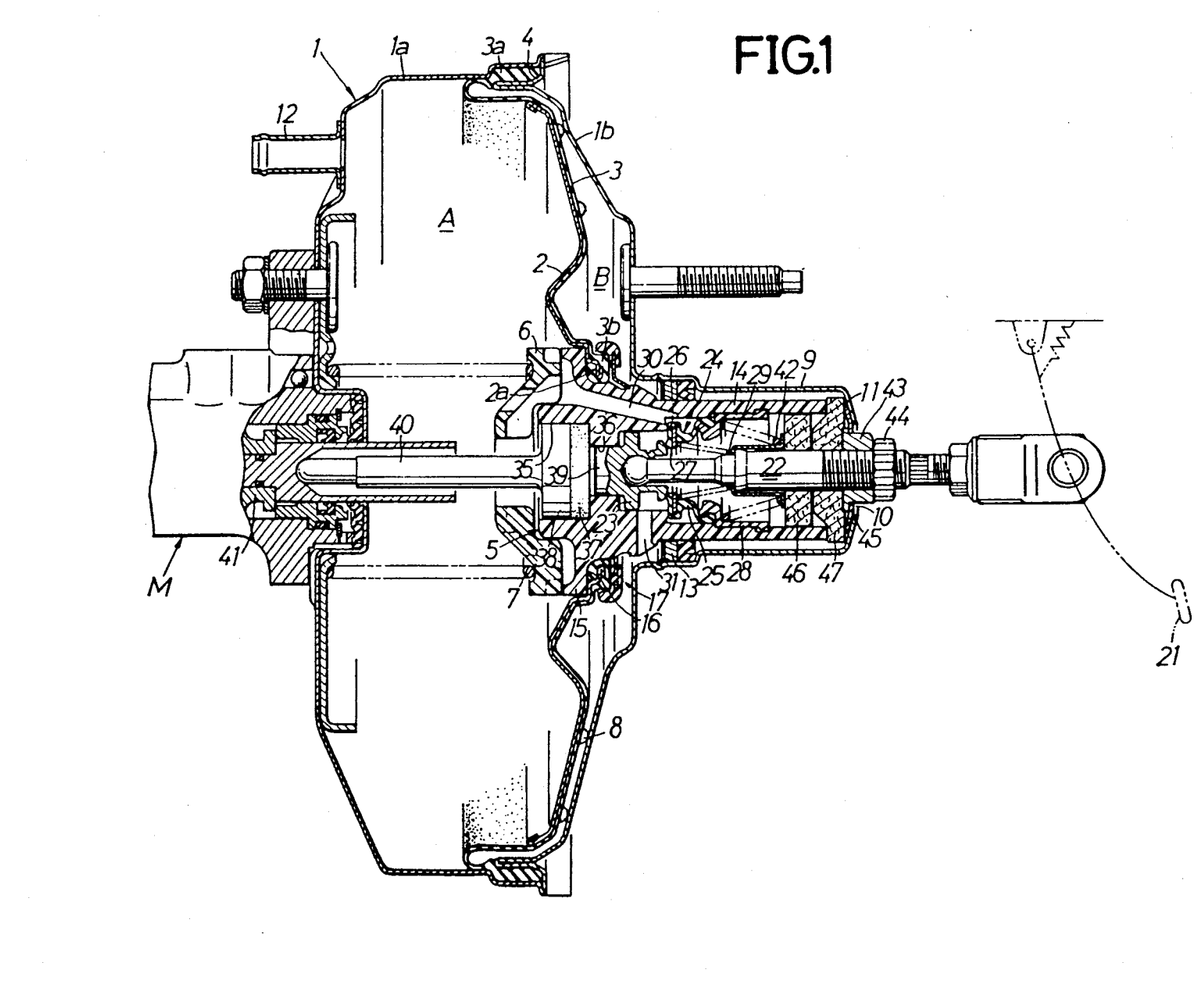
FIG. 1 is a longitudinal side view of a vacuum booster of the first embodiment.
Figure 2:
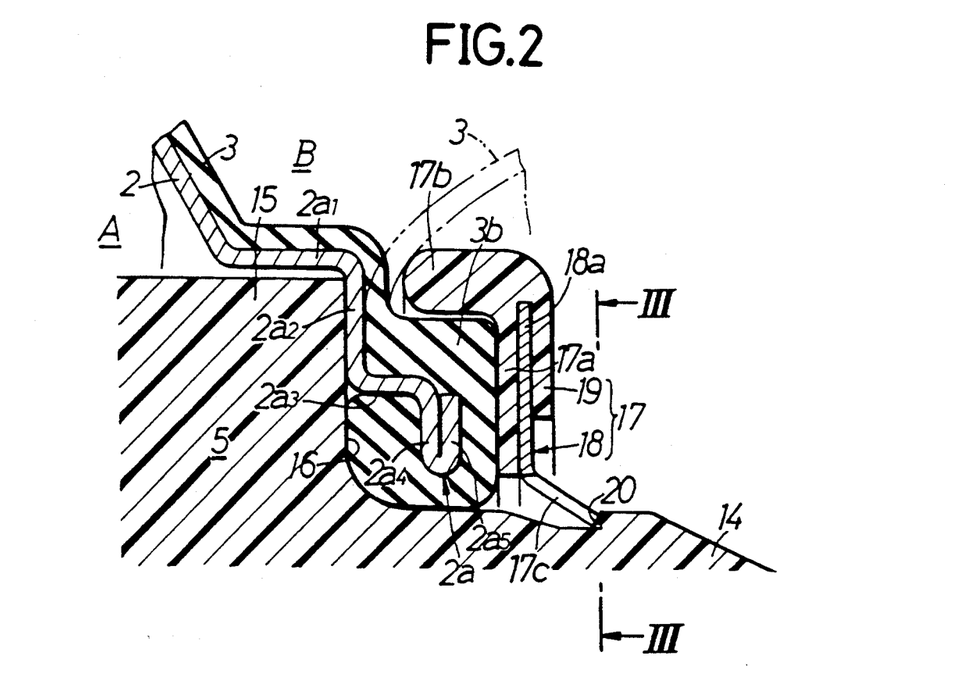
FIG. 2 is a larged view of an essential portion of the vacuum booster in FIG. 1.
Figure 3:
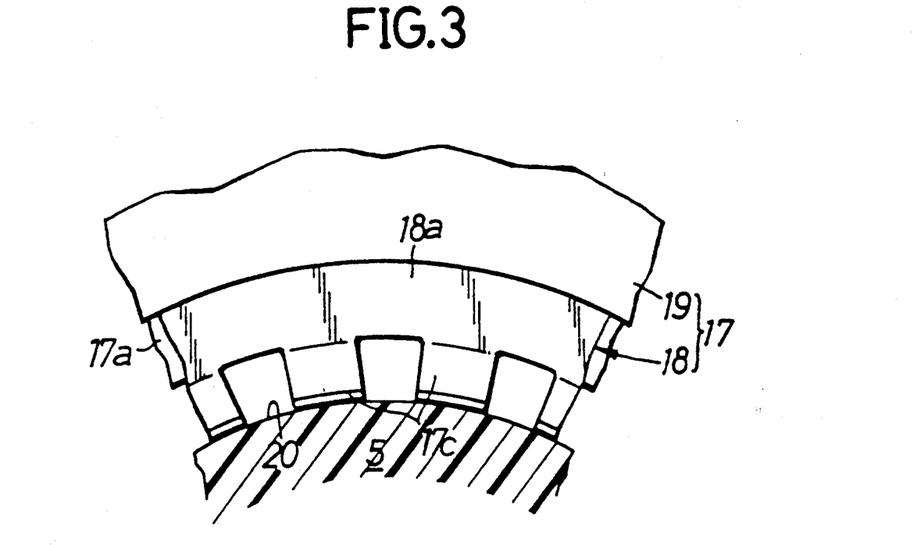
FIG. 3 is a sectional view taken along a line III—III in FIG. 2.

FIGS. 1 to 3 illustrate a first embodiment. Referring first to FIG. 1, a vacuum booster includes a booster shell 1 which is comprised of a pair of front and rear shell halves 1a and 1b coupled at their opposed ends to each other. A booster piston 2 is contained within the booster shell 1 for longitudinal reciprocal movement. A diaphragm 3 is superposed on a rear surface of the booster piston 2. The diaphragm 3 has an outer peripheral bead 3a which is secured in a groove 4 formed in a mated section of the shell halves 1a and 1b, and an inner peripheral bead 3b which is coupled to a piston boss 5 by a structure which will be described hereinafter. Moreover, the interior of the booster shell 1 is divided by the booster piston 2 and the diaphragm 3 into a front vacuum chamber A which a front surface of the booster piston 2 faces, and a rear working chamber B which a rear surface of the diaphragm 3 faces.

The booster piston 2 is normally biased in a retreating direction, i.e., toward the working chamber B by a return spring 7 which is provided in a compressed manner between a front wall of the booster shell 1 and a slip-out preventing member 6 made of synthetic resin abutting against the front surface of the piston boss 5. A retreat limit of the booster piston 2 is provided by abutment of a projection 8 formed in a raised manner on the rear surface of the diaphtragm 3 against an inner surface of a rear wall of the booster shell 1.

A rearwardly extending cylinder 9 is integrally provided in a projecting manner at a central portion of the rear wall of the booster shell 1. The cylinder 9 has at its rear end with a end wall 11 which defines an atmospheric air intake opening 10. A vacuum pressure intake pipe 12 is connected to the front wall of the booster shell 1, so that the vacuum chamber A always communicates with an intake manifold (not shown) of an internal combustion engine as a vacuum pressure source through the vacuum pressure intake pipe 12.

Referring also to FIGS. 2 and 3, the structure for securing the inner peripherl bead 3b of the diaphragm to the piston boss 5 will be described below. The piston boss 5 made of synthetic resin includes a cylindrical portion 14 slidably carried on the rearwardly extending cylinder 9 through a flat bearing 13, and a flange portion 15 projecting radially from a front end of the cylindrical portion 14 to form an annular step 16 facing rearwardly.

The inner peripherl bead 3b of the diaphragm 3 is molded to wrap the inner peripheral edge 2a of the booster piston 2 and formed into a ring-like configuration projecting rearwardly to provide a difference in level. More specifically, the inner peripheral edge 2a of the booster 2 of metal sheet is formed in a bent manner to have a large diameter cylindrical portion $2a_1$, surrounding the flange portion 15 of the piston boss 5, an engaging collar $2a_2$ projecting radially inwardly from the rear end of the large cylindrical portion $2a_1$, a small diameter cylindrical portion $2a_3$ extending rearwardly from the inner peripheral edge of the engaging collar $2a_2$, a collar $2a_4$ projecting radially inwardly from the rear end of the small diameter cylindrical portion $2a_3$, and a turn-up portion $2a_5$ turned up from the inner peripheral edge of the collar $2a_5$ rearwardly and coupled to a rear surface of the collar $2a_4$. The inner peripheral bead 3b of the diaphragm 3 is molded to wrap the inner peripheral edge 2a, with an inner peripheral surface of the large diameter cylindrical portion $2a_1$ and a front surface of the engaging collar $2a_2$ being exposed. Moreover, a front surface of the inner peripheral bead 3b is formed flush with the front surface of the engaging collar $2a_2$ and the bead 3b is abutted along with the front surface of the engaging collar $2a_2$ against the step 16 of the piston boss 5 from the rearward.

A stopper 17 abutting against the inner peripheral bead 3b from the rear is engaged with the piston boss 5. The stopper 17 comprises a washer 18 formed of metal sheet to have a chrysanthemum-shaped fixture on its inner peripheral edge, and a covering member 19 molded from hard synthetic resin to cover a portion of the washer 18. The washer 18 includes a plurality of pawls which are provided at an inner periphery of a washer body 18a formed into a circular flat plate-like configuration and which are spaced apart from one another to form the chrysanthemum-shaped fixture. Each of the pawls is inclined radially inwardly as heading rearward (rightward as viewed in FIG. 2). The covering member 19 is molded to cover the washer body 18a so that a portion thereof closer to an inner periphery of the washer body 18a in the washer 18 is exposed. The stopper 17 formed in this manner comprises a base plate portion 17a formed into a flat ring-like configuration by the covering member 19 to closely contact with the rear surface of the inner peripheral bead 3b of the diaphragm 3, an annular retaining portion 17b formed by the covering member 19 to project forwardly from the outer peripheral edge of the base plate portion 17a, and a plurality of pawls 17c projecting rearwardly from the inner peripheral edge of the base plate portion 17a at a plurality of circumferentially spaced locations to engage the piston boss 5. Moreover, the retaining portion 17b has the front end curved into a forwardly-rounded semicircle in cross-section. Each of the pawls 17c is a pawl provided on the washer 18 made of metal sheet and at its tip end engages, from the front, an annular groove 20 provided around an outer periphery of the cylindrical portion 14 in the piston boss 5. This ensures that when an urging force is applied to the base plate portion 17a of the stopper 17 rearwardly from the front, each pawl 17c exhibits a repulsive force counteracting such urging force.

On the other hand, the inner peripheral bead 3b of the diaphragm 3 is formed into a ring-like configuration projecting rearwardly to provide a difference in level, and the retaining portion 17b of the stopper 17 engaged in the engaging groove 20 surrounds the inner peripheral bead 3b.

Referring again to FIG. 1, an input rod 22 is connected to a brake pedal 21, and a valve piston 23 is swingably connected to the input rod 22 and slidably received in the piston boss 5. A control valve 24 is interposed between the working chamber B and the vacuum chamber A as well as the atmospheric air intake opening 10 and adapted to be operated for switchover in response to a relative movement of the valve piston 23 and the piston boss 5 caused by the advancing or retreating movement of the input rod 22 depending upon the operation of the brake pedal 21. Although the control valve 24 is conventionally well known, the construction of the control valve 24 will be generally described below.

The control valve 24 comprises a valve member 25 made of rubber, a first annular valve seat 26 formed on a front inner wall of the piston boss 5, so that the valve member 25 can be seated on the valve seat 26 and a second annular valve seat 27 which is formed at the rear end of the valve piston 23 slidably received in a front portion of the piston boss 5, to be surrounded by the first valve seat 26, so that the valve member 25 can be seated on the second valve seat 27.

The valve member 25 is made of elastomer material such as rubber and formed into a cylindrical shape with opposite ends thereof opened, and has the base end clamped between an inner wall of the piston boss 5 and a cylindrical valve-holding member 28 fitted in the piston boss 5. The valve member 25 has the front end formed at a larger wall thickness permitted to be seated onto the first and second valve seats 26. The valve member 25 is resiliently biased toward the first and second valve seats 26 and 27 by a valve spring 29. Thus, the valve member 25 can be deflected so that the front end thereof may be moved back and forth by the deformation of its intermediate portion.

The outside of the first valve seat 26 communicates with the vacuum chamber A through a through hole 30 provided in the piston boss 5. The intermediate space between the first and second valve seats 26 and 27 communicate with the working chamber B through another through hole 31 provided in the piston boss 5, and the inside of the second valve seat 27 communicates with the atmospheric air intake opening 10 through the interior of the valve member 25.

In such control valve 24, when the valve member 25 is seated on the first and second valve seats 26 and 27, the communication between the vacuum chamber A and the working chamber B is cut off, and the communication between the two chambers A and B and the atmospheric air intake opening 10 is also cut off. In other words, the control valve 24 is in its switchover neutral state.

When the valve piston 23 advances from such switchover neutral state relative to the piston boss 5, the second valve seat 27 is separated away from the valve member 25, permitting the working chamber B to be put into communication with the atmospheric air intake opening 10. When the valve piston 23 retreats relative to the piston boss 5, the valve member 25 is separated away from the first valve seat 26, permitting the communication between the vacuum chamber A and the working chamber B.

The piston boss 5 is provided with a large diameter cylinder bore 35 open in a central portion of the front surface of the piston boss 5, and a small diameter cylinder bore 36 connected coaxially to the rear portion of the cylinder bore 35. A resilient piston 37 made of rubber or the like and an output piston 38 are slidably received in an abutting relation to each other in the cylinder bore 35. A small shaft 39 projecting coaxially from the front end face of the valve piston 23 is received in the cylinder bore 36 and opposed to the rear end face of the resilient piston 37. The output piston 38 includes an output rod 40 provided on its front surface to project therefrom and connected to a working piston 41 in a brake master cylinder M. Slip-out of the output piston 38 from the cylinder bore 35 is inhibited by the slip-out preventing member 6 which is in abutment against the front surface of the piston boss 5.

The input rod 22 is resiliently biased in a retreating direction by a return spring 42, and the retreat limit thereof is provided by abutment of a movable stopper plate 43 mounted on the input rod 22 against the end wall 11 of the rearwardly extending cylinder 9. The movable stopper plate 43 is screwed over the input rod 22 to adjust the retreat limit in forward and backward directions, and the screwed position thereof is fixed by a lock nut 44 screwed over the input rod 22. An air vent hole 45 is made in the movable stopper plate 43 to avoid occlusion of the atmospheric air intake opening 10.

Filters 46 and 47 are mounted in a rear portion of the cylindrical member 14 in the piston boss 5 to clean the air introduced through the atmospheric air intake opening 10 and are deformable so as not to hinder the operation of the input rod 22.

The operation of the first embodiment will be described below. The control valve 24 permits the working chamber B to be put into communication with the atmospheric air intake opening 10 in response to the advancing operation of the input rod 22 depending upon the operation of the brake pedal 21. This causes the atmospheric air to be applied to the working chamber B, so that the booster piston 2 advances by a large difference in pressure developed between the vacuum chamber A and the working chamber B, enabling the working piston 41 in the master cylinder M to be operated in a boosted manner through the output rod 40. On the other hand, when the input rod 22 is retreated as a result of releasing of the operating force applied to the input rod 22, the working chamber B is put out of communication with the atmospheric air intake opening 10 by the control valve 24 and into communication with the vacuum chamber A, so that the difference in pressure between the working chamber B and the vacuum chamber A is reduced, causing the booster piston 2 to retreat by a force of the return spring 7.

In such vacuum booster, the radially intermediate portion of the diaphragm 3 is deflected toward the vacuum chamber A during a boosting operation, so that a force is applied to the inner peripheral bead 3b of the diaphragm 3 in a direction away from the step 16 about the outer peripheral edge of the step 16 in the piston boss 5. Thus, the stopper 17 engaged with the piston boss 5 exhibits a force of resiliently urging the inner peripheral bead 3b toward the step 16 from the rear, thereby preventing the inner peripheral bead 3b of the diaphragm 3 from being slipped out from the piston boss 5.

If the booster piston 2 is urged forwardly in a condition in which there is no vacuum pressure in the vacuum pressure source and no vacuum pressure is stored in the vacuum chamber A, the working chamber B may be put out of communication with the vacuum chamber A and into communication with the atmospheric air intake opening 10 by the control valve 24, so that the air in the vacuum chamber may be compressed and intended to be discharged toward the vacuum pressure source, but the pressure in the vacuum chamber A may be increased due to a resistance of such discharge. In this case, the diaphragm 3 is deflected toward the working chamber B, as shown by a dashed line in FIG. 2, about the tip end of the retaining portion 17b in the stopper 17. However, since the tip end of the retaining portion 17b made of synthetic resin is curved, even if the rear surface of the diaphragm 3 is urged strongly against the tip end of the retaining portion 17b, the rear surface of the diaphragm 3 cannot be damaged at such abutment portion.

When the diaphragm 3 is deflected toward the working chamber B about the tip end of the retaining portion 17b due to an increase in pressure in the vacuum chamber A as described above, a radially inward force is applied from the diaphragm 3 to the retaining portion 17b, thereby causing the inner peripheral bead 3b of the diaphragm 3 to be urged radially inwardly by the retaining portion 17b. Therefore, the load applied to the stopper 17 in a direction in which the inner peripheral bead 3b is moved away from the step 16 is reduced and hence, it is unnecessary to increase the engaging strength of the stopper 17 with the piston boss 5 more than necessary.

Figure 4:
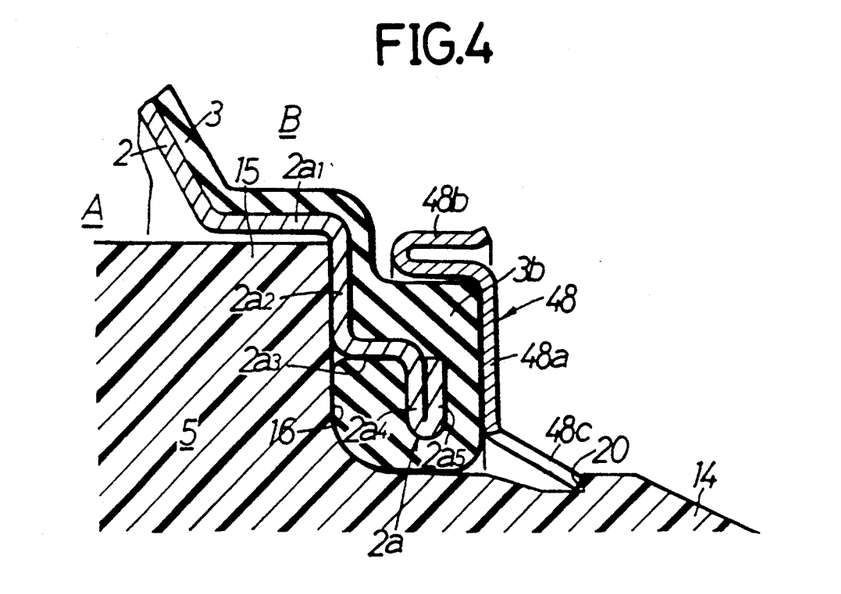
FIG. 4 is a sectional view similar to FIG. 2, but illustrating a second embodiment of the present invention.

FIG. 4 illustrates a second embodiment of the present invention, wherein parts corresponding to those in the above-described embodiment are identified by the same reference numerals and characters.

A stopper 48 is engaged with the piston boss 5 for abutting against the inner peripheral bead 3b of the diaphragm 3 from the rear. The stopper 48 is a washer formed of a metal sheet to have a chrysanthemum-shaped fixture on its inner peripheral edge and comprises a base plate portion 48a formed into a flat ring-like configuration to come into close contact with the rear surface of the inner peripheral bead 3b, a retaining portion 48b provided in a ring form to project forwardly from the outer peripheral edge of the base plate portion 48a, and a plurality of pawls 48c projecting rearwardly from the inner peripheral edge of the base plate portion 48a at a plurality of circumferentially spaced apart locations to engage the engage groove 20 in the piston boss 5 from the front.

Thus, the retaining portion 48b is formed into a double cylindrical shape with its tip end turned-up to surround an outer periphery of the inner peripheral bead 3b so as to engage such outer periphery. The tip end, i.e., turned-up portion of the retaining portion 48b is formed into a forwardly rounded semicircle. Each of the pawls 48c of the stopper 48 engages the engage groove 20 in the piston boss 5 from the front. In such engaged condition, when an urging force is applied to the base plate portion 48a rearwardly from the front, the stopper 48 exhibits a resilient force counteracting the urging force.

Even with the second embodiment, an effect similar to that in the previously described first embodiment can be provided.

Figure 5:
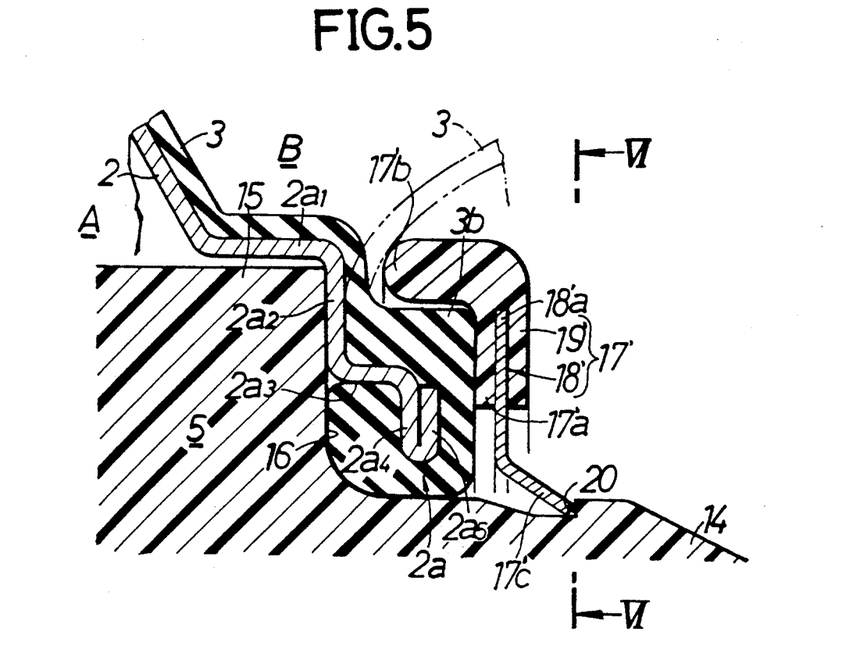
FIG. 5 is a sectional view similar to FIG. 2 but taken along a line V—V in FIG. 6.
Figure 6:
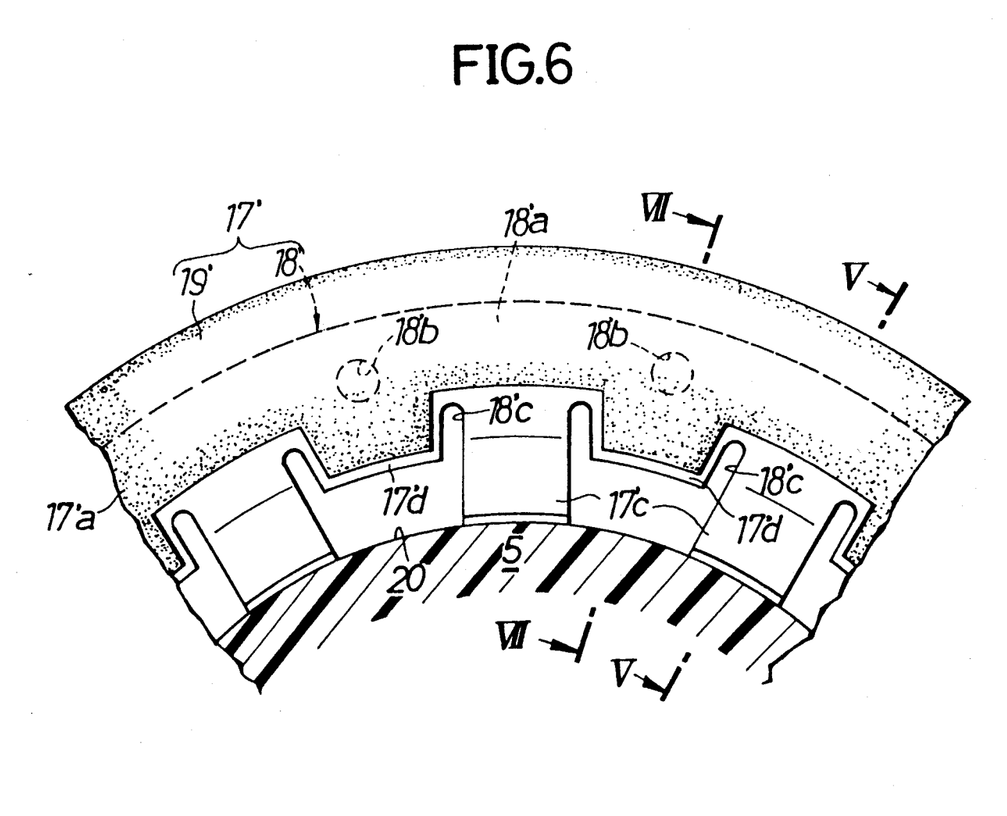
FIG. 6 is a sectional view taken along a line VI—VI in FIG. 5.
Figure 7:
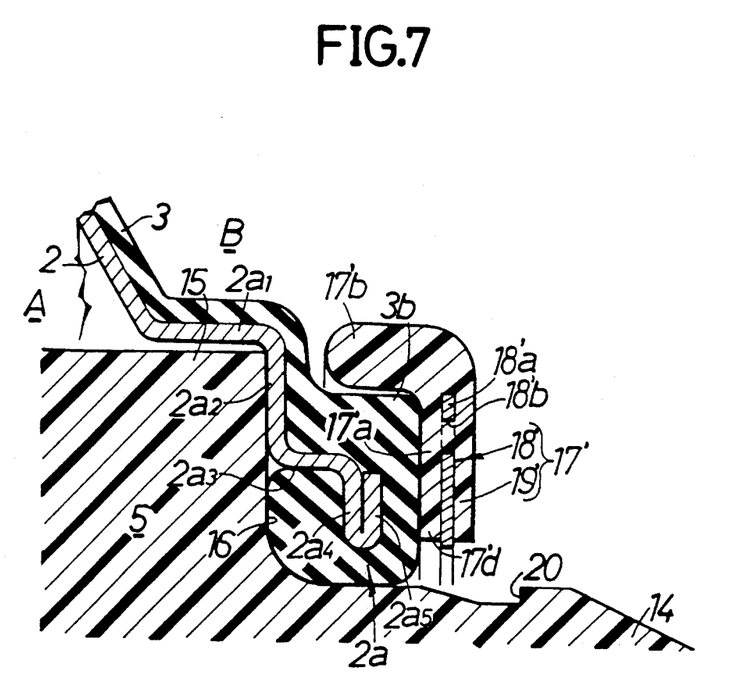
FIG. 7 is a sectional view taken along a line VII—VII in FIG. 6.

FIGS. 5 to 7 illustrate a third embodiment of the present invention, wherein parts corresponding to those in the previous embodiments are identified by the same reference characters.

Although a stopper 17' in this third embodiment has a shape similar to that of the stopper 17 in the previous first embodiment, it should be noted that there are a plurality of flat portions 17'd each provided between adjacent ones of a plurality of pawls 17'c provided on the stopper 17'. More specifically, the stopper 17' is comprised of a washer 18' formed of a metal sheet, and a covering member 19' molded from a hard synthetic resin to cover a portion of the washer 18'. The stopper 17' includes a base plate portion 17'a formed into a flat ring-like shape by the covering member 19' to come into close contact with a rear surface of the inner peripheral bead 3b of the diaphragm 3, an annular retaining portion 17'b formed by the covering member 19' to project forwardly from the outer peripheral edge of the base plate portion 17'a, a plurality of pawls 17'c projecting rearwardly from the inner peripheral edge of the base plate portion 17'a at a plurality of circumferentially spaced apart locations to engage the piston boss 5, and the plurality of flat portions 17'd connected to the inner peripheral edge of the base plate portion 17'a. The front end of the retaining portion 17'b is curved into a forwardly rounded semicircle.

The washer 18' comprises a circular, flat plate-shaped washer body 18'a, and pawl portions continuously formed with the inner peripheral edge of the washer body 18'a to form the pawls 17'c. The washer body 18'a is provided with a plurality of through holes 18'b to be filled with material of the covering member 19' during moding and coupling in order to insure the coupling to the covering member 19'. The washer 18' includes portions projecting radially inwardly between the adjacent pawls 17'c and flush with the front surface of the base plate portion 18'a, with slit 18'c interposed between a base end of each pawl 17'c and the portions. The plurality of flat portions 17'd are formed by covering the back surfaces of such projecting portions by the covering members 19'.

With the third embodiment, it is possible to provide not only effects similar to those obtained in the previous embodiments but also following effects: The inner peripheral bead 3b of the diaphragm 3 can be urged against the step 16 of the piston boss 5 by the flat portion 17'd in addition to the base plate portion 17'a, and the area of the stopper 17' in contact with the inner peripheral bead 3b can be increased to reliably urge the inner peripheral bead 3b against the step 16, thereby stabilizing the fixing of the inner peripheral bead 3b to the piston boss 5. Moreover, because the slit 18'c is interposed between each flat portion 17'd and each pawl 17'c, the resilient force can be effectively exhibited by each pawl 17'c.

What is claimed is:

1. A vacuum booster comprising:
   a booster shell;
   a piston boss carried on a central portion of a rear wall of said booster shell for a longitudinal reciprocal movement;

a booster piston contained in said booster shell for a longitudinal reciprocal movement and having a front surface facing a vacuum chamber connected to a vacuum pressure source;

a diaphragm superposed on a rear surface of said booster piston and having a rear surface facing a working chamber selectively communicated, through a control valve operatively connected to an input rod, with said vacuum chamber and the atmosphere;

said diaphragm having an outer peripheral bead coupled to said booster shell, and an inner peripheral bead which engages, from the rear, an annular step on said piston boss;

an annular stopper retained on said piston boss and including a base plate portion formed into a flat ring shape to come into close contact with a rear surface of said inner peripheral bead of said diaphragm, a plurality of pawls projecting rearwardly from an inner peripheral edge of said base plate portion at circumferentially spaced locations so as to engage said piston boss, a plurality of flat portions extending radially inwardly from said inner peripheral edge of said base plate portion at positions between adjacent pawls to be put into close contact with said rear surface of said inner peripheral bead, a slit provided between a base end of each pawl and each flat portion, and retaining portions projecting from an outer peripheral edge of said base plate portion; and said inner peripheral bead of said diaphragm being formed into a ring-like configuration projecting rearwardly so as to engage at its outer periphery with said retaining portions.

2. A vacuum booster according to claim 1, wherein said stopper comprises a metal washer which is provided at an inner peripheral edge at circumferential distances with said pawls, and a covering member molded out of a hard synthetic resin material to cover a portion of said washer.

3. A vacuum booster according to claim 2, wherein said washer is provided with a plurality of through holes to be filled with the material of the covering member when the covering member is molded and coupled to the washer.

4. A vacuum booster comprising:

a booster shell;

a piston boss carried on a central portion of a rear wall of said booster shell for longitudinal reciprocal movement in said booster shell;

a booster piston contained in said booster shell for longitudinal reciprocal movement in said booster shell and having a front surface facing a vacuum chamber connected to a vacuum pressure source;

a diaphragm superposed on a rear surface of said booster piston and having a rear surface facing a working chamber which is capable of being selectively communicated, through a control valve operatively connected to an input rod, with said vacuum chamber and the atmosphere;

said diaphragm having an outer peripheral bead coupled to said booster shell, and an inner peripheral bead which engages, from the rear, an annular step provided on said piston boss;

an annular stopper retained on said piston boss and abutting against the inner peripheral bead of said diaphragm from the rear;

said stopper including an metal washer which has a plurality or pawls projecting from an inner peripheral edge thereof at circumferentially spaced locations so as to engage said piston boss, and an annular retaining portion molded out of a hard synthetic resin material at an outer periphery of the metal washer so as to project forwardly and having a curved front end; and said inner peripheral bead of said diaphragm being formed into a ring-like configuration projecting rearwardly so as to engage, at it outer periphery, said retaining portion.

5. A vacuum booster according to claim 4, wherein said washer is provided with a plurality of through holes to be filled with the material of said retaining portion when said retaining portion is molded and coupled to said washer.

* * * * *